United States Patent
Mistry

[19]

[11] Patent Number: 6,007,942
[45] Date of Patent: Dec. 28, 1999

[54] BATTERY COMPARTMENT COMPRISING A RAISED FLOOR RIBBED STRUCTURE FOR ELECTRONIC EQUIPMENT ENCLOSURES

[75] Inventor: Mahesh B. Mistry, Parsippany, N.J.

[73] Assignee: Lucent Technologies, Inc., Murray Hill, N.J.

[21] Appl. No.: 08/907,067

[22] Filed: Aug. 6, 1997

[51] Int. Cl.$^6$ .................................................. H01M 2/02
[52] U.S. Cl. ........................... 429/100; 429/163; 429/176
[58] Field of Search ..................................... 429/100, 120, 429/72, 82, 176, 163

[56] References Cited

U.S. PATENT DOCUMENTS

| | | | |
|---|---|---|---|
| 1,183,951 | 5/1916 | Chamberlain | 429/100 |
| 1,224,439 | 5/1917 | Bosson | 429/100 |
| 1,633,887 | 1/1927 | Lyndon | 429/100 |
| 1,797,518 | 12/1931 | Boyer | 429/100 |
| 2,410,952 | 11/1946 | Lighton | 429/120 |
| 4,107,402 | 8/1978 | Dougherty et al. | 429/120 |
| 5,824,432 | 10/1998 | Currie | 429/120 |

*Primary Examiner*—Maria Nuzzolillo
*Assistant Examiner*—Monique M. Wills

[57] ABSTRACT

An improved battery compartment design for use with an outdoor equipment enclosure includes a raised floor area such that a significant portion of the bottom surface area of the battery is exposed to air flow through the cabinet. The enclosure is configured such that the outdoor air used by an included heat exchanger first passes through the battery compartment. When the outdoor air is cooler than the area in the battery compartment, the heat exchanger is turned "on" and this cooler area flows around all surfaces of the batteries, thereby reducing the battery temperature at a faster rate than conventional designs.

6 Claims, 3 Drawing Sheets

6,007,942

BATTERY COMPARTMENT COMPRISING A RAISED FLOOR RIBBED STRUCTURE FOR ELECTRONIC EQUIPMENT ENCLOSURES

BACKGROUND OF THE INVENTION

1. Technical Field

The present invention relates to a battery compartment structure for electronic equipment enclosures and, more particularly, to a battery compartment structure that provides for improved cooling capability.

2. Description of the Prior Art

Telecommunications equipment housed in outdoor enclosures frequently includes batteries that are used as a back-up source of power in case of a utility power failure. Batteries in such an environment are heated above the outdoor air temperature by the effects of the sun, equipment heat and internal heat generation associated with the batteries themselves. The service life of the batteries is a strong function of temperature. In particular, the battery life decreases exponentially as the average battery temperature rises above 25° C.

One solution to this problem is to provide air conditioning units with the battery cabinet. However, this approach requires a significant amount of power and has a relatively high operating cost. Also, the air conditioning unit itself is rather complex and requires many additional components to be used in association with the battery unit. Also, batteries are known to generate hydrogen as they are used. The air conditioning system should therefore be modified to include an auxiliary ventilation system that will dissipate the hydrogen. The auxiliary ventilation system appears as a load to the air conditioning system, thus requiring an oversized air conditioning unit with respect to the batteries.

Thus, a need remains in the prior art for a simpler and more cost effective system for cooling batteries used in outdoor enclosures.

SUMMARY OF THE INVENTION

The need remaining in the prior art is addressed by the present invention, which relates to a battery compartment structure for electronic equipment enclosures and, more particularly, to a battery compartment structure that provides for improved cooling capability.

In accordance with the present invention, an improved battery compartment is formed to include a raised floor structure such that the bottom surface of the batteries are exposed to the flow of air passing through the battery compartment. For example, the compartment may be formed to include a plurality of raised sheer tabs punched in the floor of the cabinet. Alternatively, the floor of the battery compartment may be formed to comprise a ribbed structure. The batteries then rest on the raised structure, allowing the air to flow underneath the batteries and cool off the bottom surface of the batteries. The battery compartment also includes a passive ventilation system (for example, a set of louvers) on at least one exterior surface and an exhaust area, where the exhaust area may be coupled to a heat exchanger inlet. In a preferred embodiment, therefore, outdoor air will enter through the battery compartment louvers, flows around and under the batteries and exhaust into the heat exchanger.

The improved battery compartment structure of the present invention may be used with any suitable heat exchanger system, such as a system using active cooling (i.e., a fan system to draw air through the enclosure).

Other and further arrangements of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
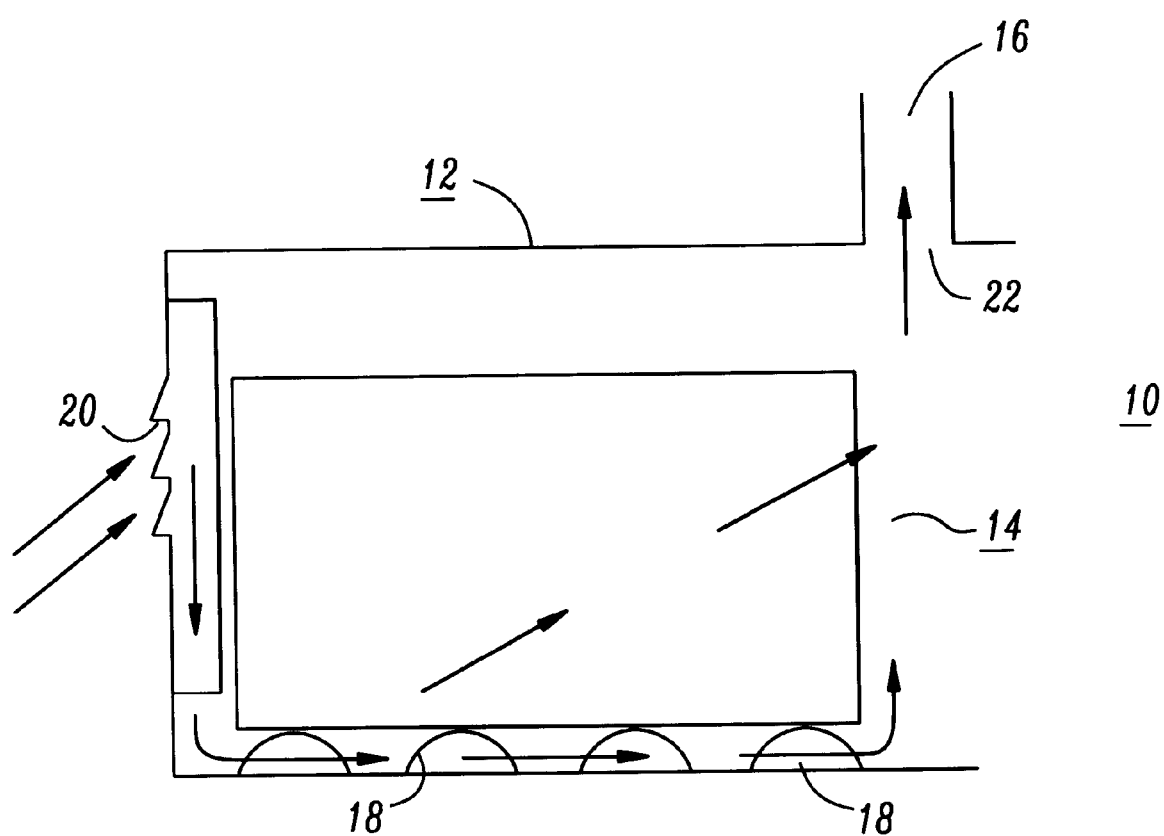
FIG. 1 illustrates an exemplary outdoor equipment enclosure including an improved battery compartment structure formed in accordance with the present invention.

An exemplary electronic equipment enclosure 10 is illustrated in FIG. 1. In its typical design, the enclosure includes a main area 12 for housing the requisite electronic equipment and a lower area 14 for containing the battery supply. A heat exchanger 16 is in communication with both battery area 14 and main area 12 for ventilating the enclosure. Various modifications to this typical arrangement are possible.

In accordance with the present invention, the configuration of battery area 14 is modified to improve battery life by better regulating the temperature in battery area 14. In particular, battery area 14 is formed to include a raised floor structure, where in the illustrated embodiment the raised structure comprises a plurality of raised floor ribs 18. The batteries thus rest upon ribs 18 so as to expose a major portion of the bottom surface area of the batteries. In an alternative embodiment, ribs 18 may be replaced by a set of individual raised sheer tabs. The individual tabs may be formed by punching indents on the exterior bottom surface of battery area 14. In general, any means for raising the batteries above the floor of area 14 so that circulating air will come into contact with a major portion of the bottom surface of each battery may be utilized in accordance with the teachings of the present invention. Battery area 14 further includes a passive ventilation system, for example, a set of louvers 20, formed on at least one side of area 14, where the passive ventilation system is used to draw the outdoor air into battery area 14. Screening material or a perforated wall section may be used as alternatives to louvers 20. Additionally, a heat exchanger inlet port 22 is positioned at the top of battery area 14. When heat exchanger 16 is turned "on", the outdoor air is drawn through louvers 20 and passes around and between the batteries in compartment 14. With the raised floor design of the present invention, a significant portion of the air flow is permitted to pass underneath the batteries, thereby improving the removal of heat from the entire battery surface.

In a preferred mode of operation, the heat exchanger is turned "on" only when the outside air temperature is less than the temperature within the battery cabinet. However, in certain environments it is possible to leave the heat exchanger turned "on" all of the time and still result in extending battery life.

One measure of improvement in battery life is related to the battery time constant, which is defined as the time required for the battery to return to 63.2% of its nominal temperature after being subjected to an extreme temperature. When the outside air is cooler than the battery compartment area (e.g., during nighttime conditions) a relatively short time constant is desired (that is, battery cooling will take place faster). During the period of time when the outside air is warmer than the battery area, a long time constant is desirous (that is, a long time constant will reduce battery heating). The battery compartment structure of the present invention achieves both of these results.

Figure 2A:
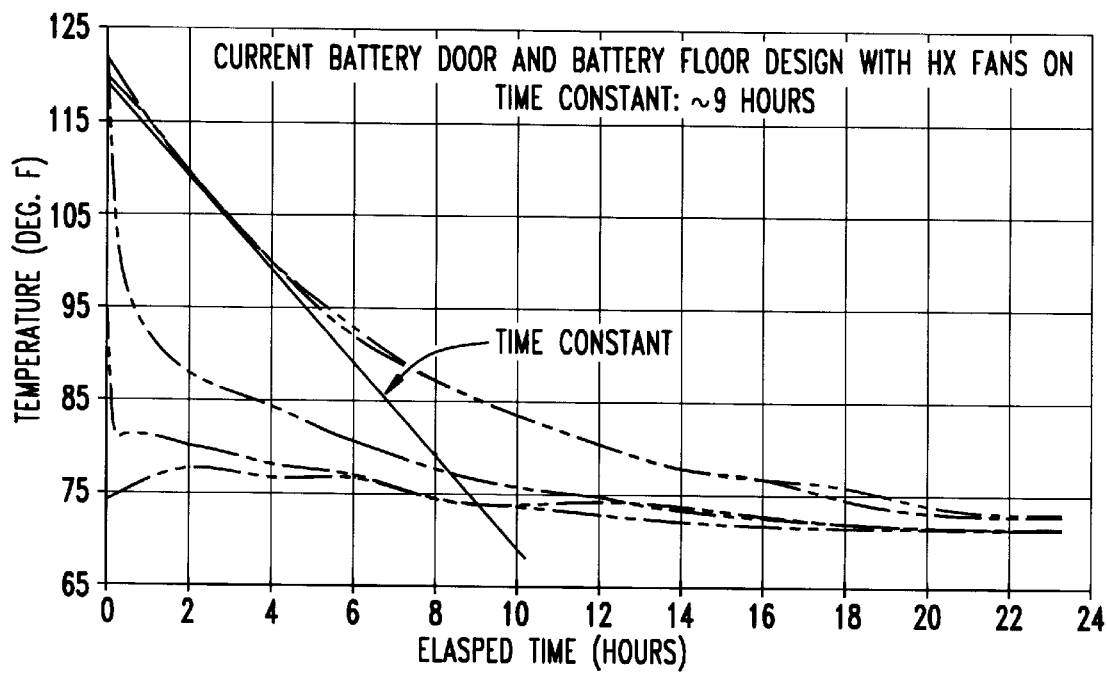
FIGS. 2 and 3 are graphs illustrating the improvement in battery life for both passive and active cooling systems incorporating the battery compartment structure of the present invention.
Figure 2B:
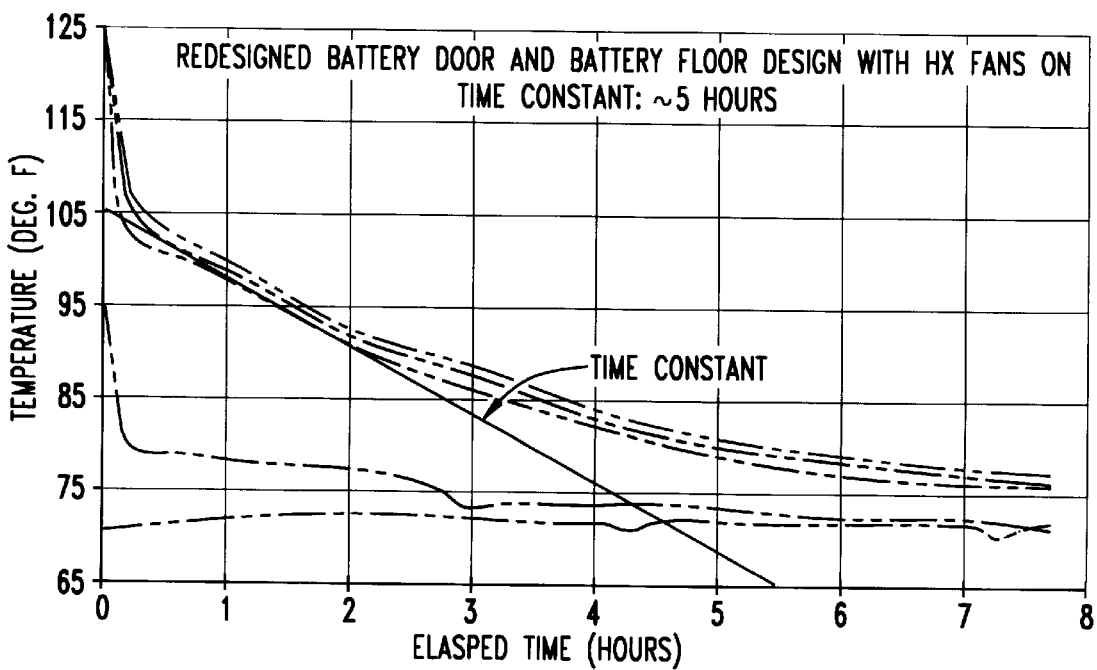

FIG. 2 contains a pair of graphs illustrating the improvement in decreasing the battery time constant with the compartment structure of the present invention. As stated above, when the outside air is cooler than the battery compartment air, the heat exchanger may be turned "on" to draw the cooler air through the battery area and cool off the batteries. FIG. 2A is a graph of battery temperature versus time for a conventional equipment enclosure including a heat exchanger. The straight line drawn off of the initial slope is used to define the time constant associated with battery cooling. For the system of FIG. 2A, the time constant is about nine hours. FIG. 2B is a similar graph, as calculated for an enclosure utilizing the improved battery compartment structure of the present invention. As shown, the "cooling off" time constant has been reduced to approximately five hours. The time constant, as discussed above, is the time required for the batteries to return to 63.2% of nominal temperature. Therefore, the battery structure of the present invention, in this particular case, has reduced the cooling time by about four hours.

Figure 3A:
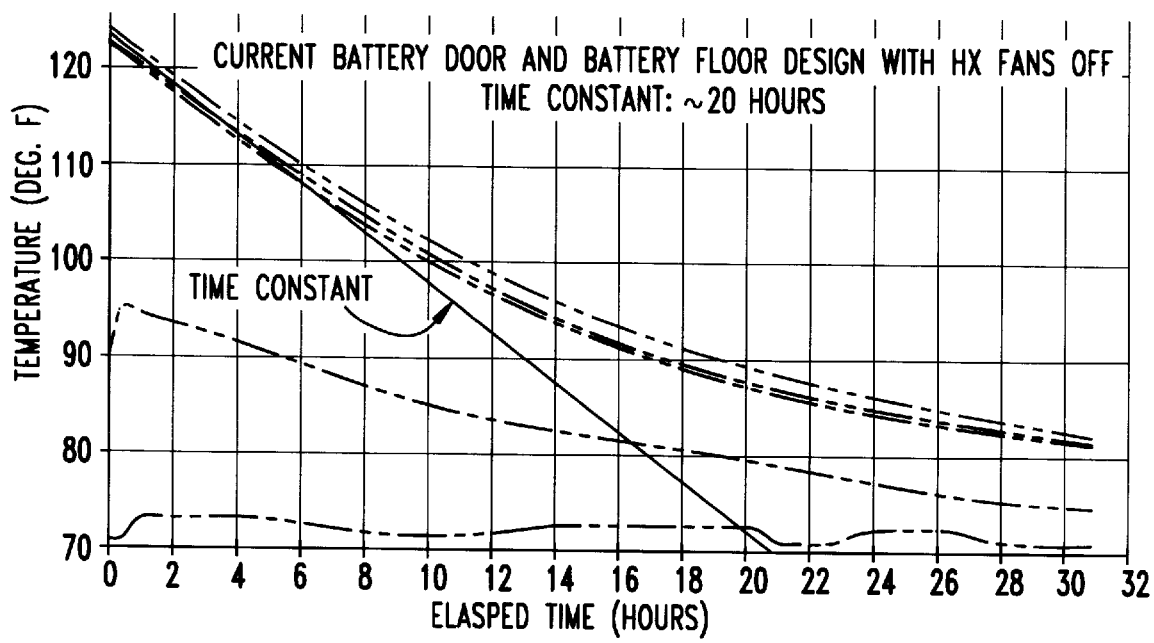
Figure 3B:
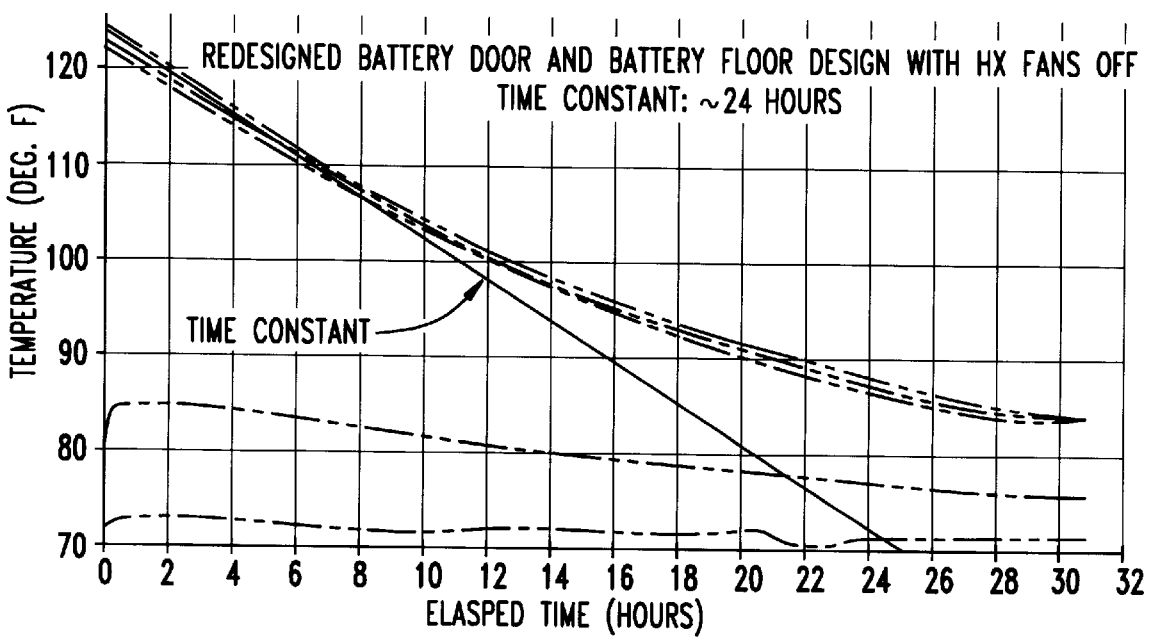

During the time of day when the outdoor air is warmer than the battery compartment, it is desired that the batteries remain "cooler" than this outdoor air for as long as possible. In this case, therefore, a longer time constant is desired. FIG. 3 contains graphs depicting this situation, where the heat exchanger is turned "off" to minimize the entry of the warmer air into the enclosure. FIG. 3A is a graph of the battery temperature versus time for a typical prior art enclosure with the heat exchanger turned "off". In this case, the measured time constant is approximately 20 hours. A graph of battery temperature versus time for an enclosure using the battery compartment structure of the present invention is illustrated in FIG. 3B. In this case, the time constant has been extended to approximately 24 hours.

In summary, the novel structure of the battery compartment, when used with a temperature-controlled heat exchanger, shortens the nighttime time constant, thus enhancing battery cooling during the relatively cooler night hours, and lengthens the daytime time constant, which reduces battery heating during the hotter day hours. The overall effect is a lower average battery temperature and thus a longer battery life. It is to be understood that various modifications can be made to the above-described embodiment of an exemplary battery cabinet formed in accordance with the present invention. The passive ventilation system, for example, may comprise any arrangement capable of allowing air to flow therethrough, including but not limited to louvers, perforations, or screens. The raised floor may likewise comprise any suitable structure capable of raising the batteries above the floor of the battery area and allowing for a sufficient portion of the bottom surface to be exposed to the air passing through the area. Additionally, while the battery compartment has been described above as a portion of a larger equipment enclosure, it is to be understood that the battery compartment may also comprise a stand-alone unit (that is, without an associated electronic equipment enclosure).

What is claimed is:

1. A battery compartment for storing a plurality of batteries in an outdoor equipment enclosure, the battery compartment including a raised floor structure formed so that portions of the bottom surface of each stored battery of said plurality of batteries will rest upon the raised structure, with the remaining bottom surface area of each stored battery exposed to air flow passing through said battery compartment.

2. A battery compartment as defined in claim 1 wherein the battery compartment further comprises passive ventilation means to allow for outdoor air to pass through the battery compartment.

3. A battery compartment as defined in claim 2 wherein the passive ventilation means comprises louvers formed on the exterior surface of the battery compartment.

4. A battery compartment as defined in claim 2 further including an associated heat exchanger wherein the passive ventilation means is formed to exhaust the air flow out of the battery compartment and into said associated heat exchanger.

5. A battery compartment as defined in claim 4 wherein the heat exchanger is configured to turn "on" only when the outdoor air temperature is less than the temperature inside the battery compartment, otherwise blocking the flow of air into the battery compartment.

6. A battery compartment as defined in claim 1 wherein the raised floor structure comprises a plurality of raised rib members.

* * * * *